May 17, 1927.
J. A. EASTES
1,628,874
FARM PULVERIZER
Filed May 28, 1926
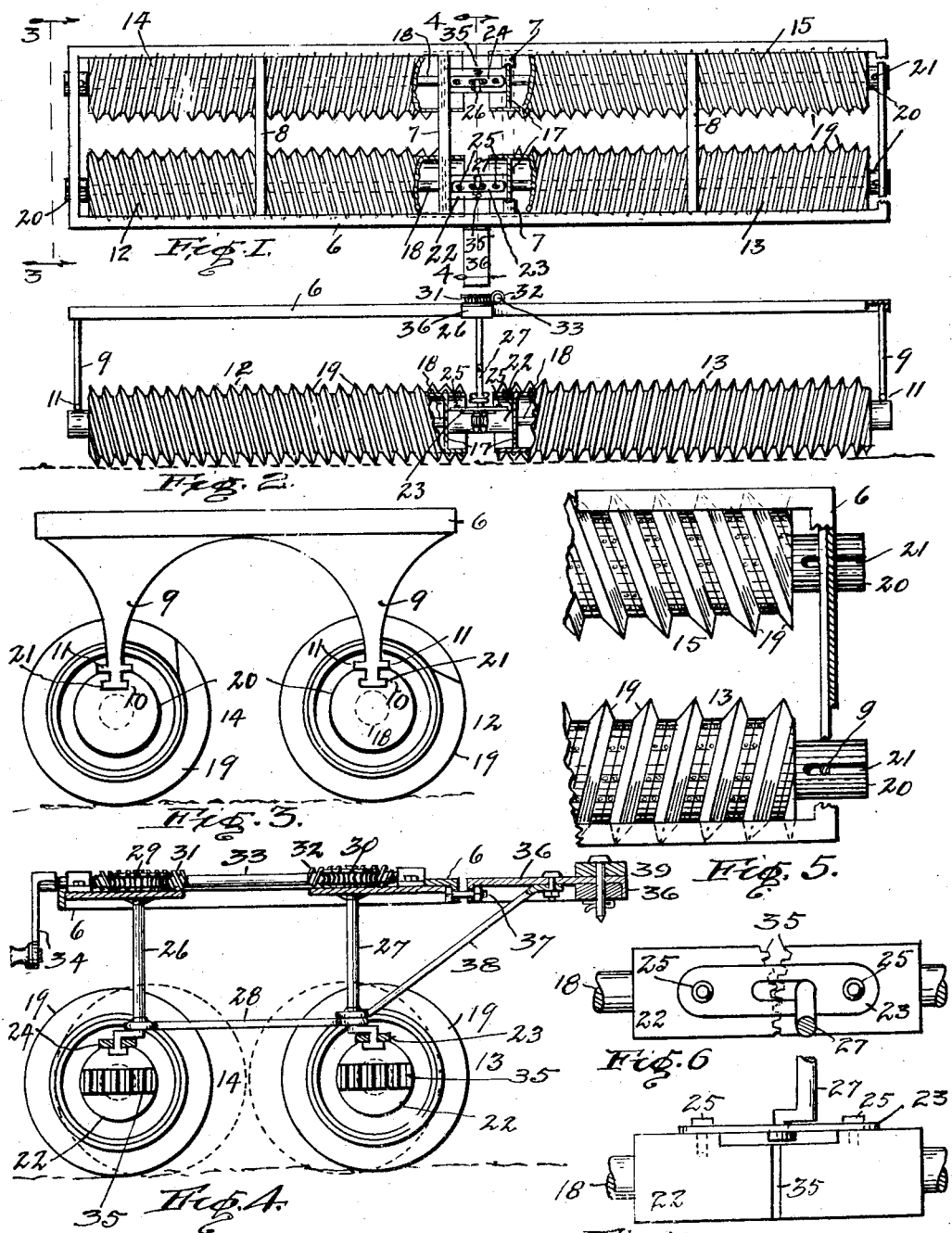
Inventor,
James A. Eastes.

Patented May 17, 1927.

1,628,874

UNITED STATES PATENT OFFICE.

JAMES A. EASTES, OF MOUNT COMFORT, INDIANA.

FARM PULVERIZER.

Application filed May 28, 1926. Serial No. 112,224.

The object of this invention is to provide a farm implement for reducing clods on plowed ground to minute particles by a rolling and crushing operation.

A further object is to provide front and rear rotating members which depress the ground surface in two oppositely oblique directions in order to balance the draft and operate on a maximum ground surface and to provide means for changing the angles and the distances apart of the front and rear rollers to insure the distribution of the depressing and crushing action equally over all parts of the plowed surface.

I accomplish the above principal objects, and other minor ones which will hereafter appear, by the mechanism illustrated in the accompanying drawing, in which—

Fig. 1, is a top plan view of my invention broken away in part and with the worm and wheel mechanism omitted.

Fig. 2, is a front elevation with the inner ends of the rollers broken away in part.

Fig. 3, is an end view looking from the line 3—3 of Fig. 1.

Fig. 4, is a vertical cross section on the line 4—4 of Fig. 1. The dotted lines show the position of the ends of the rollers at their maximum inner adjustments, and Fig. 5, is a detail in top plan view of one end of the machine, broken away in part to better illustrate the slot adjustments for the frame in the hubs.

Fig. 6, is a detail top plan view of the roller angling adjusting members; and Fig. 7, a side elevation of the members included in Fig. 6.

Like characters of reference indicate like parts in the several views of the drawing.

The main frame 6 of the machine is here shown as rectangular in shape, and formed out of metal angle bars. It has a pair of middle transverse bars 8, as may be required for strength, or convenience in supporting a platform of boards (not shown).

Attached to the ends of the frame 6, and depending therefrom, are legs 9, two at each end of the frame, which terminate with lateral extensions or heads 10, above which are a pair of diametrically opposite lugs 11, the purposes of which will be presently explained.

There are four rollers 12, 13, 14, and 15, each comprising a cylindrical drum 16, having end heads 17, which are mounted on longitudinal shafts 18. Secured to the outside walls of the drums are spiral members 19, here shown as V-shaped corrugations formed longitudinally in steel strips that are wrapped around the drums spirally and are riveted or otherwise fastened thereto. The sharp angles of the corrugations come in contact with the clods to mash them as the machine is drawn over a field.

In order to neutralize the side draft that would be caused if the spirals were all in the same direction and to mash the clods in two directions, I reverse the spirals for each roller of a front pair, and also make the spirals of each rear roller, the reverse of those of the roller in front of it, as is clearly shown in Fig. 1.

Mounted on the four outer ends of the shafts 18, are respective boxes 20, preferably of wood, having sockets in which the ends of the shafts are journaled, and extending in from the ends of each box are the top grooves 21, for the assembly therein of the corresponding legs 9. The legs 9 are slidingly inserted in the slots from the ends of the latter and the bottoms of the slots are appropriately widened to accommodate the heads 10, with the desired result that the legs can only be withdrawn through the ends of the slots in the same manner in which they were assembled, thereby holding the parts together while also allowing for a sliding adjustment of the legs in the slots, for purposes which will presently appear.

The lugs 11, on legs 9, bear upon the tops of the boxes 20, to carry the superimposed weight instead of transmitting it to the bottoms of the grooves 21.

The directions of the lines of cut made by the spiral members 19, may be changed for all four of the rollers by swinging the inner ends of each pair toward or away from each other about their legs 9 as centers. This is accomplished by mounting the inner ends of shafts 18 in boxes 22; connecting the boxes in front and rear pairs by plates 23 and 24, respectively, by pivot pins 25 near the ends of the plates; by forming longitudinal slots through the plates at their middles, through which slots the cranked ends of rocker shafts 26 and 27 are inserted, and providing means for rocking the shafts 26 and 27. The cranked ends preferably have heads below the plates to prevent the accidental withdrawal of the ends from the slots, and the shafts are linked together by a tie bolt 28 having eyes surrounding the bolts. Mounted on the upper ends of the shafts 26 and 27, are worm wheels 29 and 30, which are operatively engaged by right and left worms 31 and 32, on a shaft 33, which is manually rotated by a hand crank 34, or other suitable means. A half rotation of the two shafts 26 and 27, moves the rollers from their positions shown by full lines in Fig. 4, to the positions shown by the dotted circles. This swing of the shafts is made uniform by cog segments 35, in the adjacent ends of the boxes 22, and as the boxes are held at fixed distances from each other, the variations in their radial distances from legs 9 are compensated for by the sliding adjustments of the legs in their grooves, 21.

A draft bar 36 has a swinging connection, by bolt 37, with the frame 6, and a pull-bar 38 connects the plate with the front shaft 27. A double tree 39, or a traction hitch is connected with the outer end of draft-bar 36. The bolt 37 is loose enough in the holes through which it passes to afford limited swinging adjustment between the draft bar and the main frame of the machine with which it is connected.

While I have here shown and described the best embodiment of my invention now known to me it is obviously capable of many variations in construction and I therefore do not desire to be bound to the construction shown more than is required by the appended claims.

I claim:

1. In a clod pulverizer and ground compactor, a rear roller, crushing members projecting from the surface of the rear roller in rows obliquely to the axis of the roller, a front roller, and crushing members projecting from the surface of the front roller in rows obliquely to the axis of the front roller, the angle of inclination of the rows of crushing members on the front roller being opposite to that of the similar members on the rear roller, and the projection of said crushing members from the surface of each of said rollers being relatively small as compared to the diameter of said rollers.

2. In a clod compactor and pulverizer, a rear roller formed of two cylindrical sections, crushing members projecting from the surfaces of the roller sections in spiral relation to the axis of the roller sections, the spiral relation on one section of the roller being opposed to that on the other section, a front roller formed of two cylindrical sections, crushing members projecting from the surfaces of the front roller sections in spiral relation to the axis of the roller sections, the spiral relation of the crushing members on one front section being opposed to that on the other front section and the spiral relation on each front roller section being opposed to that on the corresponding rear roller section, said crushing members having a relatively small projection from the roller surfaces as compared to the diameter of the rollers.

3. In a ground compactor and clod pulverizer, a front roller in two cylindrical sections, a rear roller in two cylindrical sections, a crushing member forming a continuous helix about each of said roller sections, the spiral of the crushing member on one front roller section being opposed to the spiral on the other front section and the spiral on each of the front roller sections being opposed to the spiral on the corresponding rear roller section said crushing members being substantially inverted, V-shaped in cross-section and having a projection from the roller sections relatively small as compared to the roller diameters.

4. In a clod compactor and pulverizer, a rear roller formed of two cylindrical sections, crushing members projecting from the surfaces of the roller sections in spiral relation to the axis of the roller sections, the spiral relation on one section of the roller being opposed to that on the other section, a front roller formed of two cylindrical sections, crushing members projecting from the surfaces of the front roller sections in spiral relation to the axes of the roller sections, the spiral relation of the crushing members on one front section being opposed to that on the other front section and the spiral relation on each front roller section being opposed to that on the corresponding rear roller section, said crushing members having a relatively small projection from the roller surfaces as compared to the diameter of the rollers, and means for angularly positioning said front and rear roller sections with respect to each other whereby the angularity of the crushing members is varied with respect to the line of travel of the rollers.

5. In a ground compactor and clod pulverizer, a front roller in two cylindrical sections, a rear roller in two cylindrical sections, a crushing member forming a continuous helix about each of said roller sections, the spiral of the crushing member on one front roller section being opposed to the spiral on the other front section and the spiral on each of the front roller sections being opposed to the spiral on the corresponding rear roller section, said crushing members being substantially inverted V-shaped in cross-section and having a projection from the roller sections relatively small as compared to the roller diameters, and means for angularly positioning said front and rear roller sections with respect to each other whereby the angularity of the crushing members is varied with respect to the line of travel of the rollers.

In testimony whereof I affix my signature.

JAMES A. EASTES.